(12) United States Patent
Cook

(10) Patent No.: US 10,667,508 B1
(45) Date of Patent: Jun. 2, 2020

(54) MOUSE TRAP

(71) Applicant: Paul F. Cook, Champaign, IL (US)

(72) Inventor: Paul F. Cook, Champaign, IL (US)

( * ) Notice: Subject to any disclaimer, the term of this patent is extended or adjusted under 35 U.S.C. 154(b) by 0 days.

(21) Appl. No.: 16/711,588

(22) Filed: Dec. 12, 2019

Related U.S. Application Data

(63) Continuation-in-part of application No. 16/293,846, filed on Mar. 6, 2019, now Pat. No. 10,524,464.

(51) Int. Cl.
*A01M 23/30* (2006.01)

(52) U.S. Cl.
CPC .................................. *A01M 23/30* (2013.01)

(58) Field of Classification Search
CPC .............................. A01M 23/30; A01M 23/24
See application file for complete search history.

(56) References Cited

U.S. PATENT DOCUMENTS

| | | | | |
|---|---|---|---|---|
| 288,182 A * | 11/1883 | Morris et al. | ......... | A01M 23/30 43/81 |
| 528,671 A | 11/1894 | Hooker | | |
| 591,956 A * | 10/1897 | Davis | ..................... | A01M 23/30 43/81 |
| 873,988 A * | 12/1907 | Chasse | .................. | A01M 23/30 43/81 |
| 929,493 A * | 7/1909 | Rich | ..................... | A01M 23/30 43/83.5 |
| 1,194,954 A * | 8/1916 | Casey | .................. | A01M 23/30 43/81 |
| 2,311,490 A * | 2/1943 | Turpan | .................. | A01M 23/30 43/81 |
| 3,058,256 A * | 10/1962 | Wernham | .............. | A01M 23/30 43/81 |
| 5,337,512 A | 8/1994 | Krenzler | | |
| 9,119,390 B1 * | 9/2015 | Greenfield | ............ | A01M 23/30 |
| 9,131,676 B1 * | 9/2015 | Derman | ................ | A01M 23/30 |
| 10,524,464 B1 * | 1/2020 | Cook | .................... | A01M 23/30 |

* cited by examiner

*Primary Examiner* — Kristen C Hayes

(74) *Attorney, Agent, or Firm* — Philip L. Bateman

(57) ABSTRACT

A mouse trap has a trigger with a transverse helical spring at the distal end of its upper surface for receiving bait. The bait in the spring increases the likelihood of the trigger being depressed, the latch being released, and the striker striking the mouse.

7 Claims, 2 Drawing Sheets

MOUSE TRAP

CROSS-REFERENCE TO RELATED APPLICATION

This application is a continuation in part of U.S. patent application Ser. No. 16/293,846, Mar. 6, 2019, now pending.

FIELD OF THE INVENTION

This invention relates to vermin traps. More particularly, this invention relates to mouse traps having a swinging striker.

BACKGROUND OF THE INVENTION

Mouse traps (also spelled "mousetraps") are widely used to capture and kill mice. The most common type of mouse trap contains a spring-loaded striker that is released when the mouse depresses a trigger. Similar but larger traps are used for rats, chipmunks, moles, and other vermin. The term "mouse trap" is used herein to include all such spring-loaded animal traps, regardless of size. The term "mouse" is used herein to include all small vermin.

Hooker, U.S. Pat. No. 528,671, Nov. 6, 1894, discloses a mouse trap that is similar to the mouse traps widely sold today. Referring to FIGS. 1 and 2, the mouse trap 10 comprises a wooden base (also known as a platform) 20, a swinging striker (also known as a hammer) 30 consisting of a rectangular shaped metal wire, a helical spring (also known as a coil) 40 through which the base side of the swinging striker passes and having one extended end that contacts the base and one extended end that overlaps one of the sides of the swinging striker, a metal or thermoplastic trigger (also known as a trip or a bait tray) 50, and a latch (also known as a retainer bar or hold-down bar) 60. The mouse trap is shown in its unarmed (rest) position in FIG. 1 and in its armed (set) position in FIG. 2.

The mouse trap is armed by first placing food or other attractant serving as bait on the trigger. The striker is then moved 180 degrees against the force of the spring and held in place with the hand. The trigger is then raised slightly and the latch is placed over the striker to engage the trigger. The striker is then released. The spring forces the striker upwardly which, in turn, forces the latch upwardly against the slightly raised trigger to hold it in place. When the trigger is depressed by the mouse, the latch disengages, and the striker swings violently onto the mouse.

Although the basic design of the mouse trap has remained unchanged for over a century, ensuring that the mouse depresses the trigger to release the striker when eating the bait continues to cause problems. Two basic types of bait holders on the trigger have been disclosed. The Hooker mouse trap and many others contain a single recessed receptacle for holding the bait. Other mousetraps, including the one disclosed in Krenzler, U.S. Pat. No. 5,337,512, Aug. 16, 1994, contain a plurality of small holes in the trigger for receiving the bait. With both types of bait holders, mice are often able to eat the bait without depressing the trigger.

Accordingly, there is a demand for an improved mousetrap. More particularly, there is a demand for a mouse trap with a trigger that is more likely to be depressed when a mouse attempts to eat the bait.

SUMMARY OF THE INVENTION

The general object of this invention is to provide an improved mouse trap. A more particular object is to provide a mouse trap with a trigger that is more likely to be depressed when a mouse attempts to eat the bait.

I have invented an improved mouse trap having an unarmed position and an armed position. The mouse trap comprises: (a) a base having a transverse midpoint dividing the base into an unarmed side and an armed side with an end; (b) a swinging striker having a proximal end pivotably attached to the midpoint of the base and resting on the unarmed side of the base when the mouse trap is in the unarmed position and suspended above the armed side of the base when the mouse trap is in the armed position; (c) a first transverse helical spring attached to the base at the midpoint biasing the striker toward the unarmed position; (d) a trigger having a proximal end, a distal end, an upper surface, and a lower surface, the proximal end being pivotably attached to the unarmed side of the base adjacent the first helical spring, the upper surface of the distal end of the trigger having a second transverse helical spring for receiving a bait; and (e) a latch having a proximal end and a distal end, the proximal end being pivotably attached at the end of the armed side of the base and the distal end engaging the lower surface of the trigger when the mouse trap is in the armed position.

The mouse trap of this invention has a trigger that is more likely to be depressed when a mouse attempts to eat the bait.

DETAILED DESCRIPTION OF THE INVENTION

Figure 3:
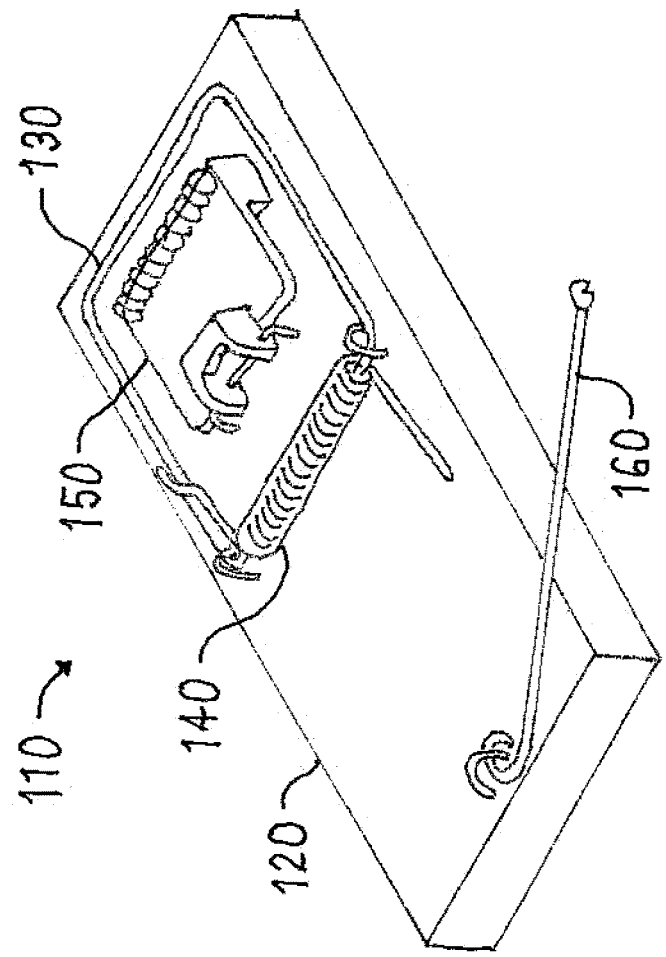
FIG. 3 is a perspective view of a preferred embodiment of the mouse trap of this invention.

This invention is best understood by reference to the drawings. Referring to FIG. 3, a preferred embodiment of the mouse trap 110 of this invention is shown in the unarmed position. The mouse trap comprises a base 120, a striker 130, a first helical spring 140, a trigger 150, and a latch 160. The components are discussed in more detail below.

The base, striker, and helical spring are conventional and are, therefore, described in only the most cursory manner. The base is generally rectangular and made of wood. The striker is biased by the helical spring from an armed position to an unarmed position. The helical spring is generally located transversely on the base at the midpoint. The helical spring thus divides the base into two generally equal sized sides. The side on which the striker rests when the mouse trap is unarmed is known as the unarmed side. The side above which the striker is suspended when the mouse trap is armed is known as the armed side.

The trigger 150 is pivotably attached at its proximal end to the base on the unarmed side adjacent the helical spring. The trigger generally has two holes through which a lengthened staple transversely attached to the base passes. Alternatively, the trigger has one or more downwardly-opening slots that frictionally fit onto the staple. The trigger serves several functions. First, it holds the bait that attracts the mouse to the mouse trap. Second, when the mouse trap is armed, the trigger (in cooperation with the latch) secures the striker in the armed position. Third, when the trigger is depressed, it releases the latch to allow the striker to swing onto the mouse. As explained in more detail below, the distal end of the trigger is preferably spaced as far as practical away from the end of the base.

The trigger contains a second transverse helical spring 151 for receiving the bait. Suitable bait includes food that is attractive to mice or other attractant. The preferred bait is a semi-solid food such as peanut butter. The spring is located on the upper surface of the trigger at or near the distal end of the trigger. The spring has interstices (spaces) between its wire rings for receiving the bait. The helical spring is preferably light in weight with the interstice width (the distance between adjacent rings) exceeding the diameter of the wire by a factor of at least two, preferably three to five. The spring is preferably made of metal wire because of its superior physical properties of strength and durability, but wires made of thermoplastics and other materials are also suitable. It can be appreciated that the function of the helical spring is to provide interstices for the bait rather than to apply a spring force. The maximum leverage is applied to the trigger by the mouse when the contact is made close to the distal end of the trigger. Accordingly, locating the spring as near as practical to the distal end maximizes the likelihood that the trigger will move and release the striker when a mouse attempts to eat the bait.

As described in detail in Example 1, it has surprisingly been found a helical spring bait holder greatly increases the likelihood of a mouse depressing the trigger when eating, or attempting to eat, the bait. While not wishing to be bound by theory, it is believed that applying a semi-solid bait such as peanut butter in the interstices of the spring makes it nearly impossible for the mouse to eat the bait without catching its teeth on the spring which, in turn, causes the trigger to depress, the latch to be undone, and the striker released. It can also be appreciated that similar small diameter structures with interstices are suitable substitutes for the second helical spring. For example, a series of separate, spaced apart, loops of various materials are suitable in that they are caught by the mouse's teeth when the mouse attempts to eat the bait in the interstices. The term "loop" is used herein to include members of any shape.

To further maximize the likelihood of the trigger being moved and releasing the striker, the trigger preferably contains extra mass (weight) at its distal end. In the preferred embodiment shown, the extra mass is added in the form of a downwardly extending base 152 on the lower surface (underside) of the trigger and in the outermost quarter of the trigger (the quarter of the length closest to the distal end of the trigger).

To further maximize the likelihood of a released striker hitting the mouse, the distal end of the trigger containing the spring is preferably spaced away from the end of the base as far as practical. This spacing makes it more difficult for a mouse to move backwards after releasing the trigger and avoid the striker.

Figure 4:
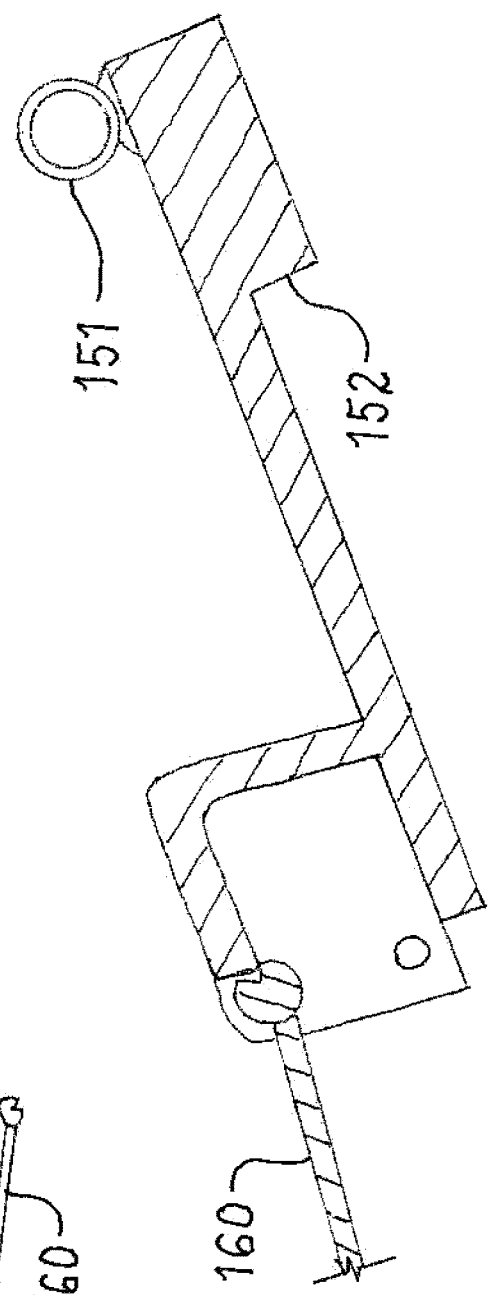
FIG. 4 is a detailed side elevation view thereof showing the distal end of the latch and the trigger in the armed position.

The latch 160 is pivotably attached at its proximal end to the base at the outer end of the armed side. The latch is generally made from metal wire. The proximal end of the latch generally is formed into an eye that is attached to a staple in the base to provide the pivoting action. The distal end of the latch generally takes one of two forms. In one form, the distal end of the latch is cut off to form a stub. In the second and preferred form, the distal end is enlarged and the enlargement 161 contains a groove 162. The term "groove" is used herein to refer to any indentation in the enlargement into which a portion of the trigger fits. The enlargement is generally spherical, but other shapes are also suitable. The groove is generally linear, but other shapes are also suitable. For example, a suitable groove in the enlargement is a rounded recess into which a projecting boss on the trigger fits. When the mouse trap is armed, the groove engages the proximal end of the trigger. As seen in FIG. 4, the groove of the preferred embodiment engages a right-angled outside corner on the lower surface of the trigger. The groove and mating portion of the trigger ensure that exactly the same amount of force is required to release the latch.

The use of the mouse trap of this invention can now be considered. The mouse trap is baited by spreading a semi-solid food such as peanut butter or other suitable attractant onto and into the interstices of the transverse helical spring on the trigger. The mouse trap is then armed in the same way as a conventional mouse trap. If the latch contains a grooved enlargement at its distal end, the groove of the latch enlargement is positioned precisely on the edge of the trigger every time.

The mouse trap of this invention is superior to conventional mouse traps because its trigger is depressed every time, or nearly every time, a mouse attempts to eat the bait.

The following example is illustrative only.

Example 1

This example illustrates the improved performance of the mouse trap of this invention.

Figure 2:
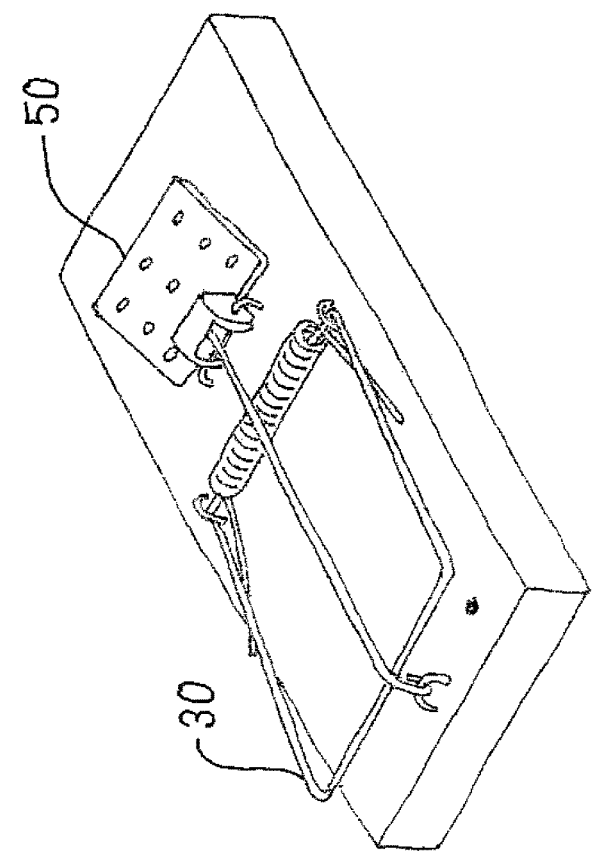
FIG. 2 is a perspective view thereof in the armed position.
Figure 1:
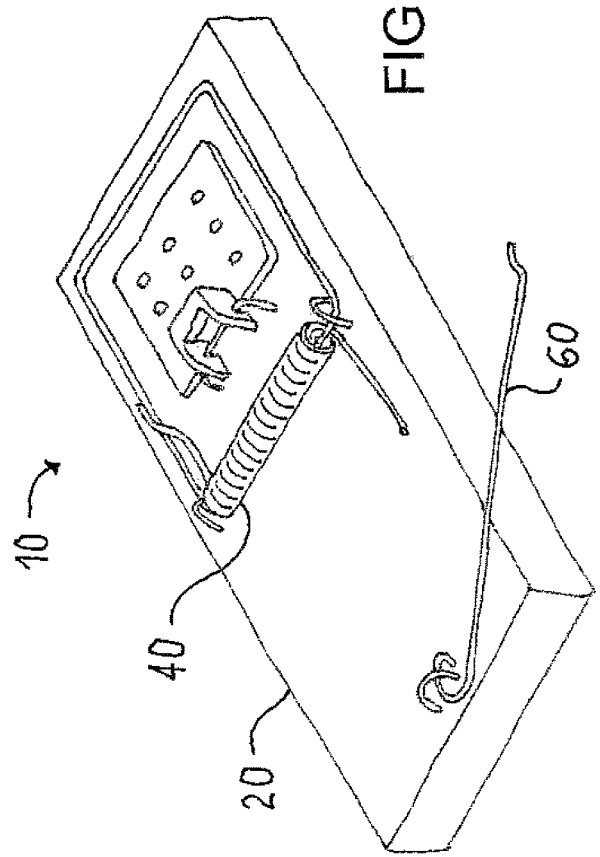
FIG. 1 is a perspective view of a prior art mouse trap in the unarmed position.

A plurality of two types of mouse traps were obtained. The first type were mouse traps commercially available from several different manufacturers. These mouse traps had triggers with multiple holes, similar to those shown in FIGS. 1 and 2. The second type were modified mouse traps. A transverse helical spring was attached on the upper surface of the trigger at the distal end as shown in FIGS. 3 and 4. The holes in the trigger were filled with epoxy.

The two groups of mouse traps were baited with peanut butter. They were then distributed in multiple mouse infested locations, including several barns, metal sheds, garages, wood piles, and grain storage areas. At each location, a commercially available mouse trap was placed in close proximity to a modified mouse trap. After a day, the mouse traps were inspected. Several of the unmodified mouse traps had lost their bait without tripping. None of the modified mouse traps had lost their baits without tripping. Either the peanut butter was still in the helical spring (indicating a mouse had not approached the trap) or the trap had tripped and killed a mouse. Many of the tripped mouse traps had dead mice with their teeth caught in the spring bait holder.

I claim:

1. A mouse trap having an unarmed position and an armed position, the mouse trap comprising:
    (a) a horizontal base having a transverse midpoint dividing the base into an unarmed side and an armed side with an end;
    (b) a swinging striker having a proximal end pivotably attached to the midpoint of the base and resting on the unarmed side of the base when the mouse trap is in the unarmed position and suspended above the armed side of the base when the mouse trap is in the armed position;
    (c) a first transverse helical spring attached to the base at the midpoint biasing the striker toward the unarmed position;
    (d) a trigger having a proximal end, a distal end, an upper surface, and a lower surface, the proximal end being pivotably attached to the unarmed side of the base adjacent the first helical spring, the upper surface of the distal end of the trigger having a second transverse helical spring for receiving a bait, the second transverse helical spring having a cylindrical void defining a horizontal axis and being made of wire with a diameter forming interstices between adjacent rings wherein the interstices have a width that exceeds the diameter of the wire by a factor of at least two; and (e) a latch having a proximal end and a distal end, the proximal end being pivotably attached at the end of the armed side of the base and the distal end engaging the lower surface of the trigger when the mouse trap is in the armed position.

2. The mouse trap of claim 1 wherein the distal end of the latch comprises a spherical enlargement with an upwardly facing surface and a groove in the upwardly facing surface for engaging the lower surface of the trigger when the mouse trap is in the armed position.

3. The mouse trap of claim 1 wherein the interstices have a width that exceeds the diameter of the wire by a factor of three to five.

4. A mouse trap having an unarmed position and an armed position, the mouse trap comprising:

(a) a horizontal base having a transverse midpoint dividing the base into an unarmed side and an armed side with an end;

(b) a swinging striker having a proximal end pivotably attached to the midpoint of the base and resting on the unarmed side of the base when the mouse trap is in the unarmed position and suspended above the armed side of the base when the mouse trap is in the armed position;

(c) a first transverse helical spring attached to the base at the midpoint biasing the striker toward the unarmed position;

(d) a trigger having a proximal end, a distal end, an upper surface, and a lower surface, the proximal end being pivotably attached to the unarmed side of the base adjacent the first helical spring, the upper surface of the distal end of the trigger having a plurality of upwardly projecting loops forming a plurality of interstices for receiving a bait, the second transverse helical spring having a cylindrical void defining a horizontal axis and being made of wire with a diameter forming interstices between adjacent rings wherein the interstices have a width that exceeds the diameter of the wire by a factor of at least two; and (e) a latch having a proximal end and a distal end, the proximal end being pivotably attached at the end of the armed side of the base and the distal end engaging the lower surface of the trigger when the mouse trap is in the armed position.

5. The mouse trap of claim 4 wherein the distal end of the latch comprises a spherical enlargement with an upwardly facing surface and a groove in the upwardly facing surface for engaging the lower surface of the trigger when the mouse trap is in the armed position.

6. The mouse trap of claim 4 wherein the interstices have a width that exceeds the diameter of the wire by a factor of three to five.

7. A mouse trap having an unarmed position and an armed position, the mouse trap comprising:

(a) a base having a transverse midpoint dividing the base into an unarmed side and an armed side with an end;

(b) a swinging striker having a proximal end pivotably attached to the midpoint of the base and resting on the unarmed side of the base when the mouse trap is in the unarmed position and suspended above the armed side of the base when the mouse trap is in the armed position;

(c) a first transverse helical spring attached to the base at the midpoint biasing the striker toward the unarmed position;

(d) a trigger having a proximal end, a distal end, an upper surface, and a lower surface, the proximal end being pivotably attached to the unarmed side of the base adjacent the first helical spring, the upper surface of the distal end of the trigger having a second transverse helical spring for receiving a bait; and (e) a latch having a proximal end and a distal end, the proximal end being pivotably attached at the end of the armed side of the base and the distal end comprising a spherical enlargement with an upwardly facing surface and a groove in the upwardly facing surface for engaging the lower surface of the trigger when the mouse trap is in the armed position.

\* \* \* \* \*